Patented May 22, 1951

2,554,461

UNITED STATES PATENT OFFICE 2,554,461

ELECTRICAL INSULATING MATERIALS

Donald Albert Howes and Samuel Richard Pethrick, Sunbury-on-Thames, Middlesex, England, assignors to Anglo-Iranian Oil Company Limited, London, England, a British joint-stock corporation No Drawing. Application February 11, 1948, Serial No. 7,705. In Great Britain February 28, 1947

5 Claims. (Cl. 260—23)

The invention relates to improvements in electrical insulating materials and has among its objects to provide a composition of matter which may be used in substitution for ceramic materials in many of their applications as electrical insulating materials.

The supply of ceramic materials at present in use is restricted in view of the fact that the method of manufacturing the materials is lengthy and must be carefully controlled as to temperature, time of baking, etc. Furthermore, as the materials cannot be easily machined they must be fabricated to exact dimensions in the first instance.

According to the invention, a composition of matter having mechanical and electrical properties such that it is suitable for use as an electrical insulating material, consists of a moulded mixture of an amount not exceeding 35% by weight of one or more binders selected from the group consisting of bitumen, paraffin wax and shale resin, and a filler consisting of one or more inert oxides or other refractory material and selected from the group consisting of alumina, zinc oxide and magnesia.

The invention also comprises a method of preparing a composition of matter having mechanical and electrical properties such that it is suitable for use as an electrical insulating material, said method consisting in dissolving the binder in a solvent therefor, impregnating the filler with the solution of the binder, and evaporating the solvent from the impregnated binder, thereby effecting a uniform dispersion of binder and filler. The impregnated filler is conveniently formed into a moulding powder by grinding.

The water resistance of the insulating composition may be increased by the incorporation of a quantity not exceeding 10% by weight of aluminium stearate. The composition may also include a proportion not exceeding 10% by weight of a modifier such as rubber, polyethylene or polyisobutylene, to reduce the brittleness of the moulded composition.

Compositions containing magnesia and bitumen possess good electrical characteristics but their properties are liable to be impaired under humid conditions by excessive water absorption. Compositions containing zinc oxide and bitumen, on the other hand, have good water resistance but their electrical properties are inferior to those of magnesia-containing compositions. Compositions containing zinc oxide, magnesia and bitumen have good electrical and water-resisting properties.

The following are examples of compositions according to the invention, all parts being by weight.

Example 1

| | |
|---|---|
| Alumina | 78 |
| Bitumen | 18.6 |
| Aluminium stearate | 0.3 |
| Polyethylene | 3.1 |

Example 2

| | |
|---|---|
| Zinc oxide | 85 |
| Bitumen | 12.2 |
| Aluminium stearate | 0.3 |
| Polyethylene | 2.5 |

Example 3

| | |
|---|---|
| Magnesia | 40 |
| Zinc oxide | 40 |
| Bitumen | 18 |
| Hard shale resin | 2 |

Example 4

| | |
|---|---|
| Zinc oxide | 90 |
| Bitumen | 8 |
| Rubber | 2 |

Example 5

| | |
|---|---|
| Zinc oxide | 66 |
| Magnesia | 22 |
| Bitumen | 10 |
| Polyisobutylene | 2 |

Example 6

| | |
|---|---|
| Magnesia | 80 |
| Bitumen | 18 |
| Hard shale resin | 2 |

Example 7

| | |
|---|---|
| Magnesia | 80 |
| Bitumen | 12 |
| Polyisobutylene | 8 |

Example 8

| | |
|---|---|
| Magnesia | 77 |
| Bitumen | 19 |
| Rubber | 4 |

Example 9

| | |
|---|---|
| Magnesia | 80 |
| Bitumen | 12 |
| Polyisobutylene | 6 |
| Aluminium stearate | 2 |

The following tests were carried out on all these compositions.

*Hardness*

The hardness was determined by means of a hardness meter (described in B. S. specification No. 903.) The specimens were in the form of pellets ½ inch in diameter and ¼ inch thick. The penetration of a 3/32 inch diameter ball under a load of 565 grams was measured in tenths of a millimeter after one minute of loading.

*Water absorption*

Pellets were prepared by charging sufficient powder into a cylindrical mould (½ inch in diameter) to form a pellet approximately ¼ inch thick and pressing at 18,000 p. s. i. The pellets were weighed and immersed in distilled water at room temperature. The samples were removed periodically, surface dried by wiping with filter paper and re-weighed. The immersion was continued until the water absorption reached a maximum.

*Heat resistance*

Cylindrical rods each ½ inch in diameter and 1 inch in length were formed by moulding at 18,000 p. s. i. The rods were supported at two points ¼ inch apart, with the longer axis in a horizontal position. The specimens were straddled with a 24 S. W. G. copper wire carrying a weight of 900 g. at each end and the assembly heated in an oven at the specified temperature (±1° C.) until signs of indentation, cutting or bending of the rod were apparent. Materials were considered to be satisfactory if no signs of softening occurred after heating for 24 hours at 100° C.

The results of these tests and some electrical properties of the compositions are set out in the following table.

| Composition No. | Hardness | Water Absorption, Per Cent | Softening Temperature, °C. | Electrical Properties | | |
|---|---|---|---|---|---|---|
| | | | | S. I. C. | Power Factor, 1000 v., 50 cycles | Volume Resistivity, ohms/cm.$^3$ |
| 1 | 2.5 | 3.76 | >100 | 9.5 | 0.12 | $2.2 \times 10^{13}$ |
| 2 | 3.5 | 0.05 | >100 | 5.5 | 0.15 | $1.9 \times 10^{12}$ |
| 3 | 2.0 | 2.42 | >100 | 4.3 | 0.08 | $4 \times 10^{13}$ |
| 4 | 2.0 | 0.328 | >100 | 5.0 | 0.15 | $2.25 \times 10^{12}$ |
| 5 | 2.5 | 0.39 | >100 | 4.15 | 0.08 | $3 \times 10^{13}$ |
| 6 | 2.0 | 4.80 | | 4.5 | 0.05 | $2.3 \times 10^{14}$ |
| 7 | 2.0 | 0.70 | >100 | 4.35 | 0.36 | $3 \times 10^{14}$ |
| 8 | 2.0 | 1.0 | >100 | 3.8 | 0.05 | $2.5 \times 10^{14}$ |
| 9 | 3.0 | 0.14 | >100 | 4.7 | 0.05 | $3 \times 10^{14}$ |

Comparison of Examples 2 and 4 and of Examples 6 and 9 will indicate the reduction in water absorption resulting from the inclusion of aluminium stearate in the composition. Example 5 shows that the use of zinc oxide and magnesia together, enables the low water absorbing properties of the zinc oxide to be retained with an improvement in the electrical properties due to the inclusion of the magnesia.

We claim:

1. A composition of matter having mechanical and electrical properties such that it is suitable for use as an electrical insulating material in substitution for ceramic materials, being a uniform mouldable mixture comprising an amount not exceeding 35% by weight of at least one binder selected from the group consisting of bitumen, paraffin wax and shale resin, and a magnesia-zinc oxide mixture.

2. A composition of matter in accordance with claim 1 which includes an amount not exceeding 10% by weight of aluminum stearate and an amount not exceeding 10% by weight of a modifier selected from the group consisting of rubber, polyethylene and polyisobutylene.

3. A composition of matter in accordance with claim 1 wherein the binder is bitumen.

4. A composition of matter according to claim 1, which includes an amount not exceeding 10% by weight of aluminium stearate.

5. A composition of matter according to claim 1, which includes an amount not exceeding 10% by weight of a modifier selected from the group consisting of rubber, polyethylene and polyisobutylene.

DONALD ALBERT HOWES.
SAMUEL RICHARD PETHRICK.

REFERENCES CITED

The following references are of record in the file of this patent:

UNITED STATES PATENTS

| Number | Name | Date |
|---|---|---|
| Re. 17,762 | Reeve | Aug. 5, 1930 |
| 373,290 | Higbie | Nov. 15, 1887 |
| 415,864 | Gibson | Nov. 26, 1889 |
| 2,022,827 | Ruben | Dec. 3, 1935 |
| 2,280,860 | Smyers | Apr. 28, 1942 |
| 2,344,579 | Whitesides | Mar. 21, 1944 |
| 2,372,230 | Sommer | Mar. 27, 1945 |
| 2,382,443 | Robinson et al. | Aug. 14, 1945 |
| 2,408,297 | Cubberley et al. | Sept. 24, 1946 |

OTHER REFERENCES

Hunter et al., British Plastics, March 1945, pp. 94–98.

Hahn et al., Ind. & Eng. Chem., June 1945, pp. 526–533.